United States Patent
Sumida et al.

(10) Patent No.: US 10,248,450 B2
(45) Date of Patent: Apr. 2, 2019

(54) VIRTUAL MACHINE MIGRATION USING A PREDICTION ALGORITHM

(71) Applicant: FUJITSU LIMITED, Kawasaki-shi, Kanagawa (JP)

(72) Inventors: Hiroki Sumida, Mishima (JP); Yasuo Yoshimoto, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 78 days.

(21) Appl. No.: 15/652,697

(22) Filed: Jul. 18, 2017

(65) Prior Publication Data
US 2018/0024856 A1    Jan. 25, 2018

(30) Foreign Application Priority Data
Jul. 25, 2016  (JP) ................................ 2016-145792

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/4557* (2013.01); *G06F 2009/45595* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 2013/0097601 A1* | 4/2013 | Podvratnik | G06F 9/5027 718/1 |
| 2014/0325068 A1* | 10/2014 | Assuncao | H04L 41/082 709/226 |
| 2015/0007178 A1 | 1/2015 | Kaneko et al. | |
| 2016/0070601 A1 | 3/2016 | Yamamoto et al. | |

FOREIGN PATENT DOCUMENTS

| | | |
|---|---|---|
| JP | 2012-198671 A | 10/2012 |
| JP | 2015-11569 A | 1/2015 |
| WO | 2014/192132 A1 | 12/2014 |

* cited by examiner

*Primary Examiner* — Charlie Sun
(74) *Attorney, Agent, or Firm* — Westerman, Hattori, Daniels & Adrian, LLP

(57) ABSTRACT

A virtual machine control device includes a processor configured to acquire usage information including an actual usage value of respective virtual machines operating on each of information processing apparatuses during each of past periods, and create, for each of the information processing apparatuses, prediction information including a prediction usage value of the respective virtual machines during each of periods. The processor is configured to determine, upon detecting a first virtual machine whose actual usage value is not included in the usage information, whether a first period exists, in which a sum of the actual usage value of the first virtual machine and prediction usage values of virtual machines operating on a first apparatus exceeds a criterion. The processor is configured to issue, upon determining that the first period exists, an instruction to move one of virtual machines operating on the first apparatus to a second apparatus before the first period.

6 Claims, 17 Drawing Sheets

FIG.3
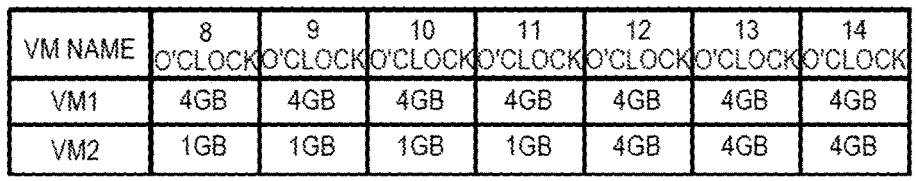
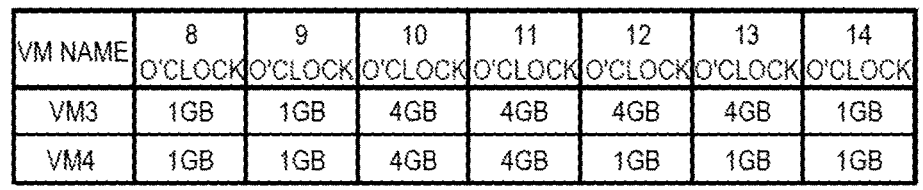
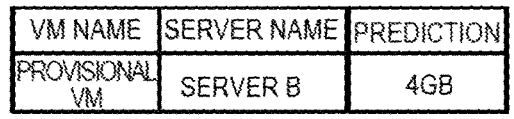

FIG.9
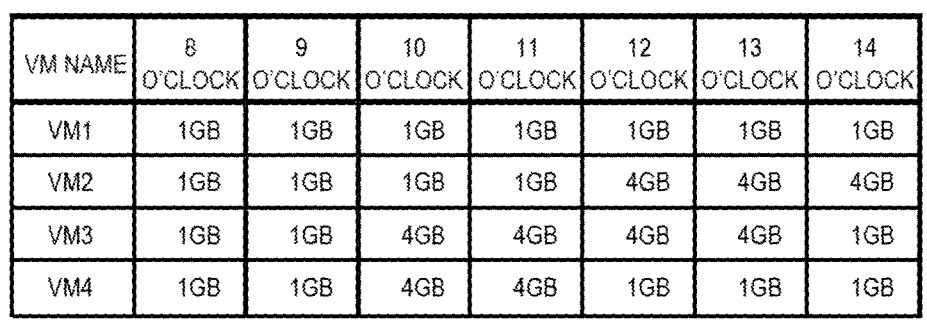
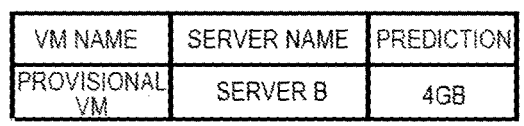

| VM NAME | SERVER NAME | MEMORY |
|---|---|---|
| VM1 | SERVER A | 4GB |
| VM2 | SERVER A | 4GB |
| VM3 | SERVER B | 4GB |
| VM4 | SERVER A | 1GB |
| VM5 | SERVER B | 3GB |

| VM NAME | 8 O'CLOCK | 9 O'CLOCK | 10 O'CLOCK | 11 O'CLOCK | 12 O'CLOCK | 13 O'CLOCK | 14 O'CLOCK |
|---|---|---|---|---|---|---|---|
| VM1 | 4GB | 4GB | 4GB | 4GB | 4GB | 4GB | 4GB |
| VM2 | 1GB | 1GB | 1GB | 1GB | 4GB | 4GB | 4GB |
| VM3 | 1GB | 1GB | 4GB | 4GB | 4GB | 4GB | 1GB |
| VM4 | 1GB | 1GB | 4GB | 4GB | 1GB | 1GB | 1GB |
| VM5 | - | - | - | 3GB | 3GB | 3GB | 3GB |

VIRTUAL MACHINE MIGRATION USING A PREDICTION ALGORITHM

CROSS-REFERENCE TO RELATED APPLICATION

This application is based upon and claims the benefit of priority of the prior Japanese Patent Application No. 2016-145792, filed on Jul. 25, 2016, the entire contents of which are incorporated herein by reference.

FIELD

The embodiments discussed herein are related to a virtual machine control method and a virtual machine control device.

BACKGROUND

The introduction of virtual environments is being progressed for reducing the facility costs of servers, and in order to efficiently utilize resources such as memories, it is important to balance the loads (resource usage) among a plurality of physical servers. For example, there has been proposed a technique for monitoring a load on each physical server and moving a virtual machine (VM) from a high load physical server to a low load physical server.

As a related technique, there has been proposed a technique for predicting a time series variation in resource consumption of each of a plurality of VMs and selecting an arrangement plan in which resource consumption is equal to or less than a reference value for determination in each of a plurality of physical machines. There has also been proposed a technique for predicting the latest time when the usage of a physical resource of an information processing apparatus exceeds a capability value of the physical resource and executing rearrangement of sharing of information processing by the predicted time.

Related technologies are disclosed in, for example, International Publication Pamphlet No. WO 2014/192132 and Japanese Laid-Open Patent Publication No. 2012-198671.

SUMMARY

According to an aspect of the present invention, provided is a virtual machine control, device including a memory and a processor coupled to the memory. The processor is configured to acquire usage information stored in a storage unit. The usage information includes an actual usage value of respective virtual machines operating on each of information processing apparatuses during each of past periods. The actual usage value is an amount of a resource used by the respective virtual machines during each of the past periods. The processor is configured to create prediction information for each of the information processing apparatuses on basis of the acquired usage information. The prediction information includes a prediction usage value of the respective virtual machines during each of periods corresponding to the past periods. The prediction usage value is an amount of the resource to be used by the respective virtual machines operating on each of the information processing apparatuses during each of the periods. The processor is configured to determine, upon detecting a first virtual machine whose actual usage value is not included in the usage information, whether a first period exists, in which a sum of the actual usage value of the first virtual machine and prediction usage values of virtual machines operating on a first apparatus of the information processing apparatuses exceeds a criterion for the first apparatus. The first virtual machine operates on the first apparatus. The processor is configured to issue, upon determining that the first period exists, an instruction to move one of virtual machines operating on the first apparatus to a second apparatus of the information processing apparatuses before the first period. The second apparatus is different from the first apparatus.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of usage information and provisional VM setting information;

FIG. 9 is a diagram illustrating usage information and provisional VM setting information in an Example;

DESCRIPTION OF EMBODIMENTS

When the load on a certain physical server is relatively high, a load balancing may be performed in order to move a virtual machine (VM) operating on the physical server to another physical server. However, since the load is imposed on the server when moving the VM, the processing for balancing the load temporarily increases the load. Therefore, when the VM is moved in a time zone in which the load is relatively high, the load caused by the movement of the VM is added and further increased. As a result, the load is not balanced among the plurality of physical servers, which results in difficulty in efficiently utilizing the resources.

First Embodiment

Figure 1:
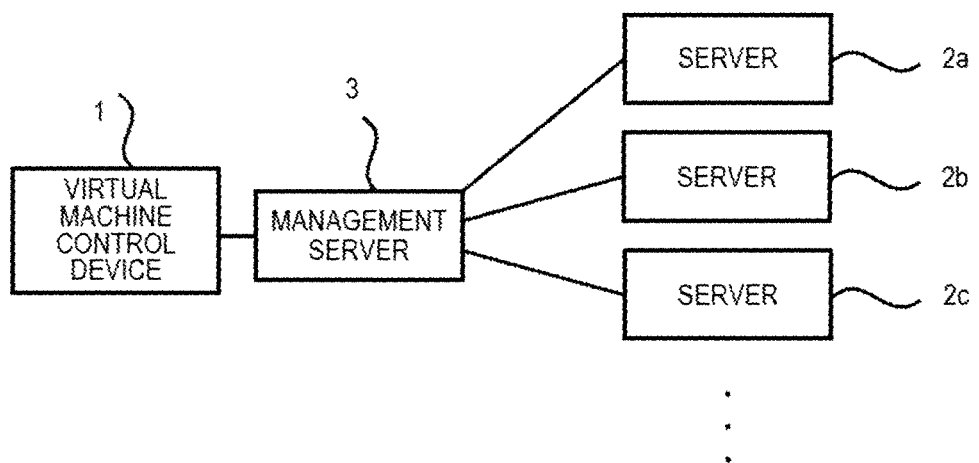
FIG. 1 is a diagram illustrating an exemplary configuration of a system according to a first embodiment.

Hereinafter, a first embodiment will be described with reference to the accompanying drawings. FIG. 1 illustrates an exemplary configuration of a system according to the first embodiment. As illustrated in FIG. 1, the system according to the first embodiment includes a virtual machine control device 1, two or more servers 2a, 2b, 2c, . . . , and a management server 3, all of which are coupled to each other via a communication line. Hereinafter, the servers 2a, 2b, 2c, . . . , may be collectively referred to as a server 2.

The virtual machine control device 1 controls a virtual machine (VM) that operates on the server 2. The virtual machine control device 1 outputs an instruction to the management server 3 to operate a virtual machine, which has been operating on one server 2, on another server 2 depending on resource usage. The virtual machine control device 1 is an example of a computer.

The server 2 is capable of operating the virtual machine within a predetermined range of memory capacity. In response to an instruction from the management server 3, the server 2 may move an active virtual machine to another server 2. The server 2 is an example of an information processing apparatus.

The management server 3 is a server that manages the server 2. In response to an instruction from the virtual machine control device 1, the management server 3 controls a virtual machine operating on the server 2.

In the example illustrated in FIG. 1, the management server 3 and the virtual machine control device 1 are separate devices but may be the same device. That is, instead of the management server 3 and the virtual machine control device 1 illustrated in FIG. 1, the system may include a single device having both functions of the management server 3 and the virtual machine control device 1.

Figure 2:
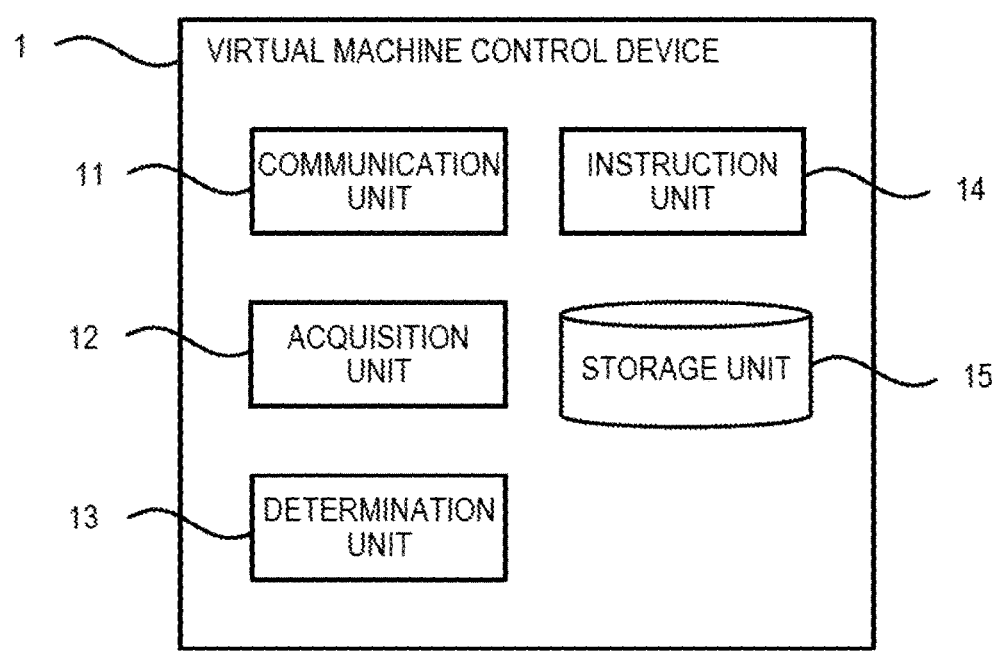
FIG. 2 is a diagram illustrating an example of a virtual machine control device according to a first embodiment.

FIG. 2 is a diagram illustrating an example of the virtual machine control device according to the first embodiment. As illustrated in FIG. 2, the virtual machine control device 1 includes a communication unit 11, an acquisition unit 12, a determination unit 13, an instruction unit 14, and a storage unit 15.

The communication unit 11 receives information indicating resource usage of a virtual machine operating on the server 2. When sending an instruction from the instruction unit 14 to the management server 3, the communication unit 11 transmits information indicating the contents of the instruction.

The acquisition unit 12 refers to usage information including the resource usage of each virtual machine, which is stored in the storage unit 15, to acquire an actual value of the resource usage of a plurality of virtual machines during each of a plurality of past periods.

Upon detecting, among virtual machines operating on any server 2, a virtual machine whose resource usage is not included in the usage information, the determination unit 13 determines whether or not there is a period within which a total value of the actual value acquired by the acquisition unit 12 and the resource usage of the detected virtual machine exceeds a criterion for any information processing apparatus. Further, in case that a situation different from the prediction information created by the acquisition unit 12 occurs, upon detecting no virtual machine whose resource usage is not included in the usage information, the determination unit 13 appropriately updates the prediction information and determines whether or not there is a period within which a total value of the resource usage of virtual machines operating on any server 2 and the resource usage of a provisional VM exceed the criterion for any information processing apparatus. The virtual machine whose resource usage is not included in the usage information is, for example, a newly deployed virtual machine.

When there is a period within which the total value exceeds the criterion, the instruction unit 14 instructs the management server 3 to operate one of the virtual machines, which have been operating on any server 2, on another server 2 before that period.

The storage unit 15 stores usage information including resource usage indicating an amount of resources used by virtual machines in each server 2 during the respective periods. The usage information includes resource usage of each virtual machine operating on each server 2 during each predetermined time. The resource usage is an amount of physical resources used in the server 2. The resource usage illustrated in an example to be described later is the memory usage but may be a central processing unit (CPU) usage rate, for example.

The storage unit 15 also stores therein setting information of a provisional virtual machine (provisional VM). The provisional VM is a virtual machine which is not actually used yet, and is set as a margin for coping with an increase of virtual machines in the future. The setting information of the provisional VM includes the name of a server where the provisional VM is set, and the resource usage.

FIG. 3 is a diagram illustrating an example of usage information and provisional VM setting information. Information on virtual machines (VMs) operating on a server A and a server B is recorded in usage information 31 and usage information 32 illustrated in FIG. 3, respectively. In this example, each of the usage information 31 and the usage information 32 includes an actual value of the memory usage of each VM from 8 o'clock to 14 o'clock hourly. The unit of time for which the actual value is recorded is not limited to one hour. The range of time in which the actual value is recorded is from 8 o'clock to 14 o'clock in FIG. 3 but may be 24 hours. For example, in a case where the virtual machine control device 1 is applied to a system in which the memory usage greatly varies depending on a day of the week, the time unit for which the actual value is recorded may be one day (24 hours), and the time range in which the actual value is recorded may be one week.

Provisional VM setting information 33 includes the name of the server where the provisional VM is set, and the memory usage of the provisional VM. For example, the maximum allocatable memory capacity per VM that is permitted in the server 2 is set in the memory usage of the provisional VM. By setting the maximum allocatable memory capacity per VM in the memory usage of the provisional VM, it is possible to reduce the risk of exceeding the memory capacity of the server 2 in the memory usage when a new VM is added in the future.

Although the number of provisional VMs is one in the example illustrated in FIG. 3, it may be two or more. The provisional VMs may be set in separate servers 2. For example, the number of provisional VMs may be determined based on an average value of the number of newly deployed VMs in an actual operation in a past predetermined period or may be determined based on the maximum value of the number of newly deployed VMs in the actual operation in the past predetermined period. In a case of further reducing the risk of exceeding the memory capacity of the server 2, the number of provisional VMs may be determined based on a value obtained by multiplying the average value by a safety factor (for example, 1.1).

Figure 4:
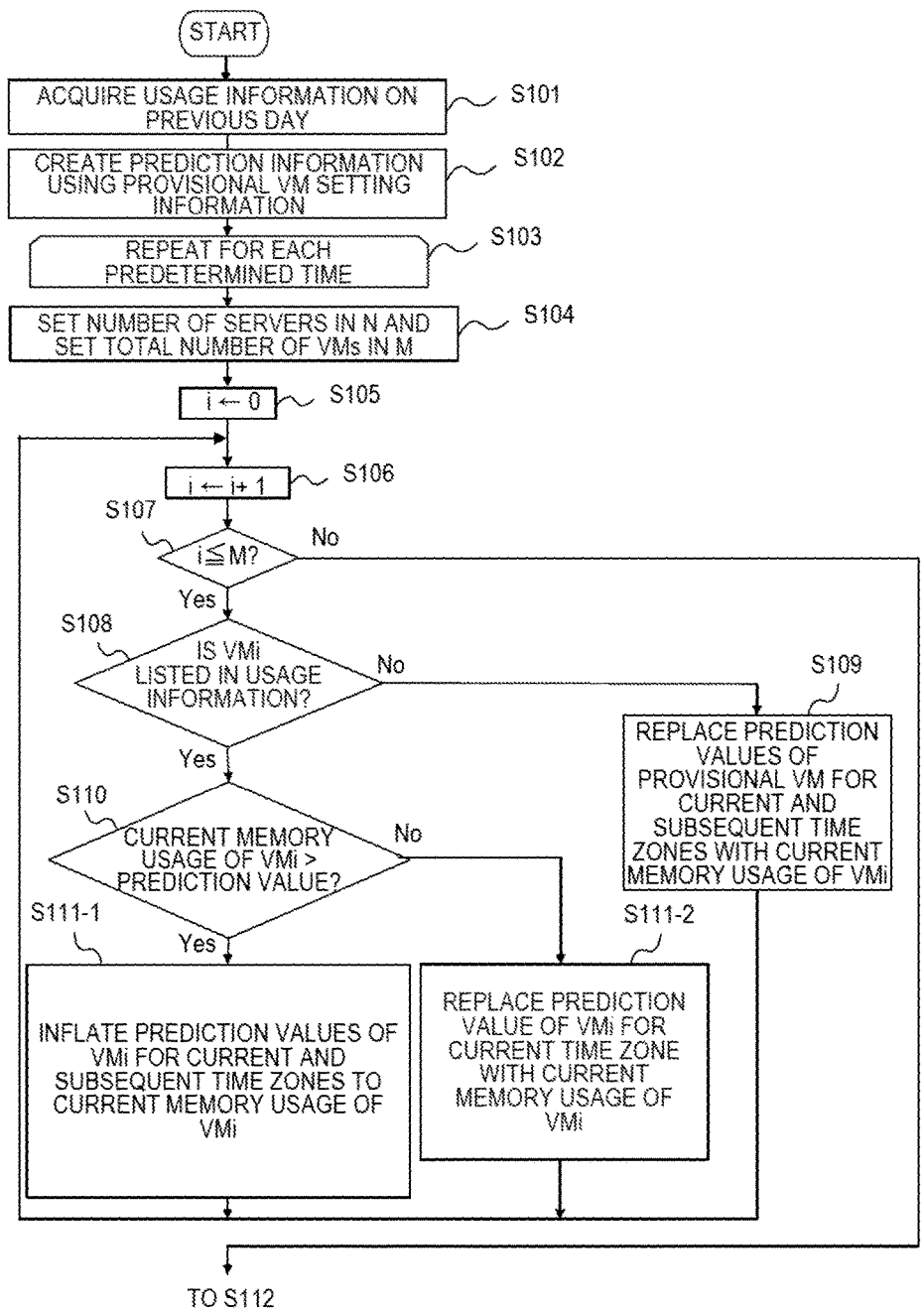
FIG. 4 is a flowchart illustrating an exemplary processing flow according to a first embodiment.
Figure 5:
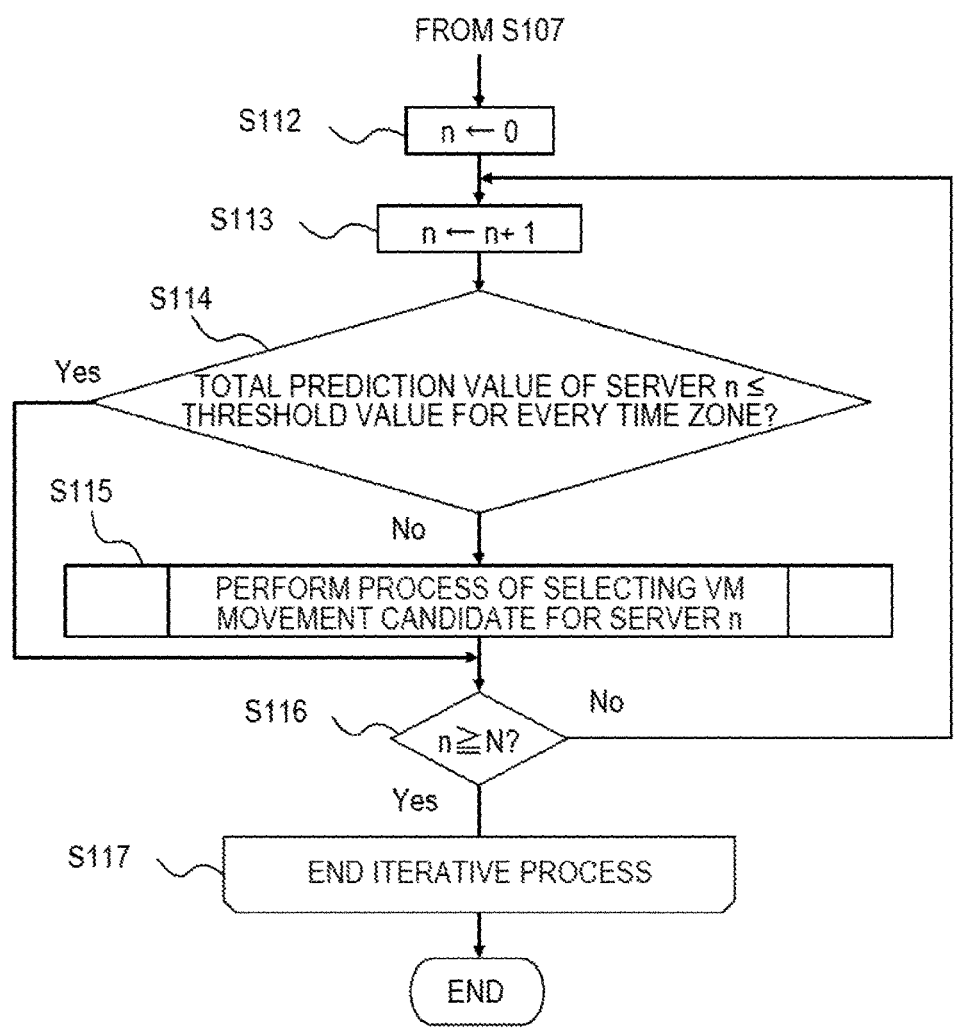
FIG. 5 is a flowchart illustrating an exemplary processing flow according to a first embodiment.

FIGS. 4 and 5 are flowcharts illustrating an exemplary processing flow according to the first embodiment. The processing illustrated in FIGS. 4 and 5 starts, for example, at a predetermined time every day.

The acquisition unit 12 acquires, from the storage unit 15, usage information including resource usage in each server 2 during each time period on the previous day (S101). In the first embodiment, as illustrated in FIG. 3, the resource usage included in the usage information is the memory usage.

The acquisition unit 12 acquires setting information of a provisional VM from the storage unit 15. The acquisition unit 12 creates prediction information on the basis of the usage information by modifying the usage information with the setting information of the provisional VM (S102). In the first embodiment, as illustrated in FIG. 3, the acquisition unit 12 acquires, as the setting information of the provisional VM, the name of a server in which the provisional VM is set and memory usage. For example, by recording the memory usage defined in the setting information of the provisional VM in the usage information of at least one server 2 for every time zone, the acquisition unit 12 creates prediction information to which the memory capacity of the provisional VM is added.

For example, when the memory usage in each server whose resource usage is recorded in the usage information has a margin, the acquisition unit 12 may create the prediction information without using the setting information of the provisional VM in S102.

The determination unit 13 starts an iterative process for executing VM movement (S103).

For the iterative process to be described later, the determination unit 13 sets the number of servers 2 obtained from the usage information in a variable N and sets the total number of VMs obtained from the prediction information in the variable M (S104). In the first embodiment, the iterative process is performed every hour. The iterative process is performed for each time zone recorded in the usage information.

The determination unit 13 sets 0 in i, which is used for discriminating VMs from each other (S105). The determination unit 13 increments i by 1 (S106). When i is equal to or less than M (YES in S107), the determination unit 13 determines whether or not VMi is listed (included) in the usage information (S108).

The determination unit 13 measures the current memory usage of the VMi and updates the prediction value for the corresponding time zone on the basis of the measured memory usage. When a new VMi which is not listed in the usage information is added, the determination unit 13 determines that the new VMi is deployed in the server 2 in which the provisional VM is set in the prediction information. The instruction unit 14 outputs, to the management server 3, an instruction to deploy the new VM in the server 2 in which the provisional VM is set in the prediction information. Then, the determination unit 13 replaces the prediction value of the provisional VM for the current and subsequent time zones in the prediction information with the current memory usage of the new VMi (S109).

For the existing VMs listed in the usage information, the determination unit 13 determines whether or not the current memory usage of each VM is larger than the prediction value at the present time (S110). For example, when the present time is 8 o'clock, the determination unit 13 determines whether or not the current memory usage of each virtual machine is greater than the prediction value at 8 o'clock (the actual value at 8 o'clock on the previous day). When the current memory usage of any VM is larger than the prediction value at the present time (YES in S110), the process proceeds to S111-1. The determination unit 13 replaces the prediction value of the VMi for the current and subsequent time zones in the prediction information with the current memory usage of the VMi as long as a time zone in which the prediction value is less than the current memory usage of the VMi continues (S111-1).

The reason for updating the prediction value not only at the current time zone but also subsequent time zones in S111-1 is to secure the necessary memory capacity assuming that the current memory usage is kept unchanged.

In a case of NO in S110, the determination unit 13 replaces the prediction value of VMi for the current time zone in the prediction information with the current memory usage of VMi (S111-2). The reason for updating the prediction value for only the current time zone and not updating the prediction value for subsequent time zones is to reduce the risk that the memory usage exceeds the memory capacity of the server. For example, even when the current memory usage is less than the prediction value, there is a possibility that the memory usage will increase to a value close to the prediction value in the future. Therefore, the determination unit 13 may not update the prediction value for subsequent time zones to a smaller value (the current memory usage).

In S111-1, for example, assuming that the usage information illustrated in FIG. 3 is the usage information of the previous day, if the memory usage of VM3 at 8 o'clock (present) is 2 GB, only the prediction values at 8 o'clock and 9 o'clock are replaced with 2 GB, and the prediction value at 14 o'clock is not replaced with 2 GB. This is because the memory usage of VM3 increases to 4 GB at 10 o'clock in the usage information and it is predicted that the memory usage will continue to be 2 GB until that time.

Next, the determination unit 13 sets 0 in a variable n (S112). Further, the determination unit 13 increments the variable n by 1 (S113). The variable n corresponds to a sequence number assigned to each server.

On the basis of the prediction information created in the S109, S111-1 and S111-2, the determination unit 13 determines whether or not the sum of prediction values of VMs operating on a server (hereinafter, referred to as a server n) to which the sequence number n is assigned is equal to or less than a threshold value for every time zone after the present time (S114). The threshold value is a threshold value for memory usage set for each server and is assumed to be, for example, 90% of the memory capacity of the server.

When there is at least one time zone for which the total prediction value of the server n exceeds the threshold value of the server n (NO in S114), since any one VM of the server n needs to be moved to another server, the determination unit 13 performs a process of selecting a candidate for a VM to be moved (S115). The process of selecting a candidate for a VM to be moved will be described later with reference to FIGS. 6 and 7. When the total prediction value of the server n is equal to or less than the threshold value for every time zone after the present time (YES in S114), the determination unit 13 determines whether or not n is equal to or larger than N (S116). When it is determined that n is equal to or larger than N (YES in S116), the determination unit 13 ends the iterative process (S117). When it is determined that n is less than N (NO in S116), the process returns to S113.

Figure 6:
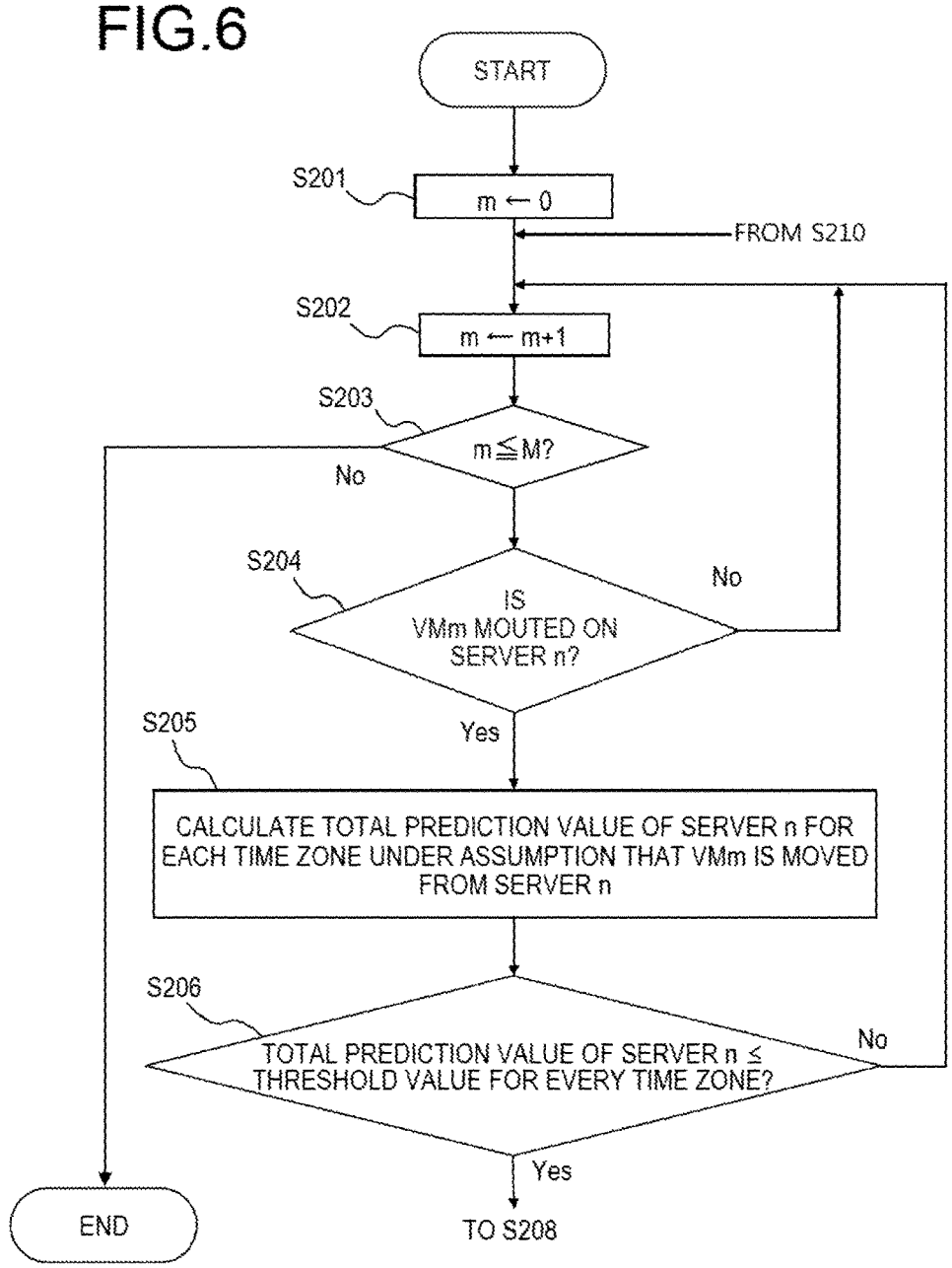
FIG. 6 is a flowchart illustrating an exemplary process of selecting a candidate for a VM to be moved according to a first embodiment.
Figure 7:
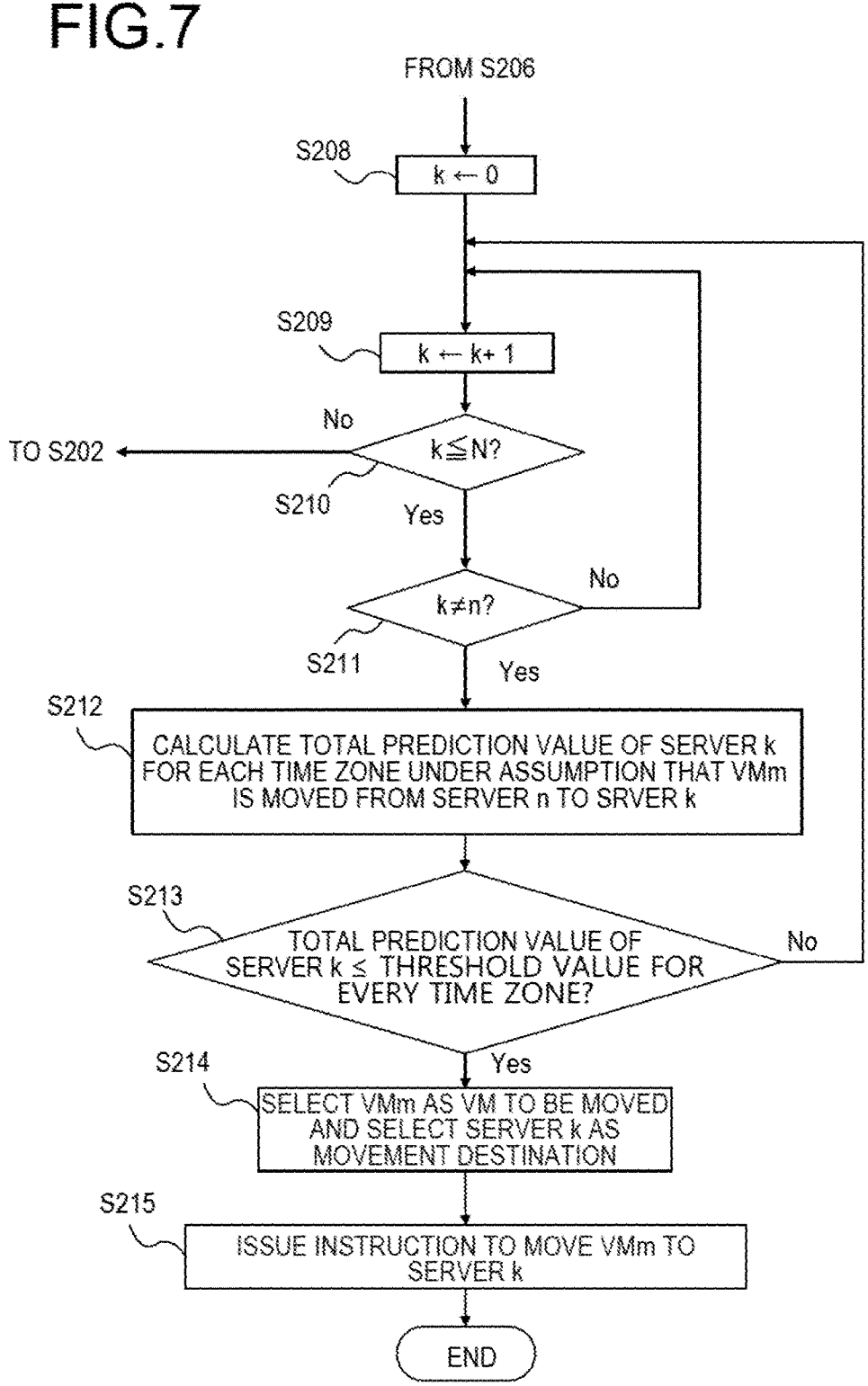
FIG. 7 is a flowchart illustrating an exemplary process of selecting a candidate for a VM to be moved according to a first embodiment.

FIGS. 6 and 7 are flowcharts illustrating an exemplary process of selecting a candidate for a VM to be moved. The process illustrated in FIGS. 6 and 7 is a detailed process of S115 in FIG. 5 and is a process of selecting a VM to be moved and a server (movement destination server) to which the VM is moved.

The determination unit 13 sets 0 in a variable m (S201). Further, the determination unit 13 increments the variable m by 1 (S202). The variable m corresponds to a sequence number assigned to each VM.

In S203, the determination unit 13 determines whether m is equal to or less than M. When it is determined that m is larger than M (NO in S203), the determination unit 13 ends the process since the determination process has been completed for all the VMs When it is determined that m is equal to or less than M (YES in S203), the determination unit 13 determines whether or not a VM (hereinafter referred to as a VMm) to which the sequence number m is assigned is mounted on the server n (S204).

When the VMm is mounted on the server n (YES in S204), under the assumption that the VMm is moved from the server n to another server in the current time zone, the determination unit 13 calculates the sum of prediction values of the respective VMs operating on the server n for each time zone (S205). This calculation considers no movement destination. The determination unit 13 determines whether or not the total prediction value of the server n calculated in S205 is equal to or less than the threshold value for every time zone after the present time (S206). When it is determined that the total prediction value of the server n is equal to or smaller the threshold value in every time zone after the present time (YES in S206), the VMm is determined to be a candidate for a VM to be moved.

When it is determined that the total prediction value of the server n exceeds the threshold value in at least one time zone after the present time (NO in S206), the determination unit 13 returns to S202. That is, the determination unit 13 repeatedly executes S202 to S206 while incrementing the variable m until the total prediction value of the server n becomes equal to or less than the threshold value in every time zone.

In the process of selecting a VM to be moved, it is preferable to select a VM with the lowest movement cost. The movement cost is determined, for example, based on the size of the current memory usage or the number of times of movement. The greater the movement cost, the greater the load on the server in the movement.

In the example illustrated in FIGS. 6 and 7, the determination unit 13 performs S205 and S206 from a VM having a smaller sequence number and selects the VM when YES in S206. For this reason, the smaller sequence number is assigned to a VM with a lower movement cost in advance. As a result, when a plurality of candidates for a VM to be moved exist, a VM with the lowest movement cost is selected.

Further, for example, when YES in S206, the determination unit 13 may temporarily store the identified VM as a candidate for a VM to be moved and may perform S204 to S206 on all the VMs. Then, the determination unit 13 may select, as a VM to be moved, the VM with the lowest movement cost, among the candidates for a VM to be moved determined as YES in S206.

When YES in S206, the determination unit 13 proceeds to the process of selecting a movement destination server. The determination unit 13 sets 0 in a variable k (S208). Then, the determination unit 13 increments the variable k by 1 (S209). The variable k corresponds to a sequence number assigned to each server.

The determination unit 13 determines whether or not k is equal to or less than N (S210). When it is determined that k is larger than N (NO in S210), the process returns to S202. This is because, even when the threshold value is exceeded for all servers in S213 (described later) under the assumption that the VMm is moved, there is a possibility that the total prediction value of the server n may be equal to or less than the threshold value in S213 by setting a different VMm as a candidate to be moved.

When it is determined that k is equal to or less than N (YES in S210), the determination unit 13 determines whether or not k is different from n (S211). Since n is a sequence number indicating a server on which the VMm is currently operating, when k is equal to n (NO in S211), the process returns to S209 in which k is incremented.

When it is determined that k is different from n (YES in S211), under the assumption that the VMm is moved from the server n to a server k in the current time zone, the determination unit 13 calculates the sum of prediction values of VMs operating on the server k for each time zone (S212). The determination unit 13 determines whether or not the total prediction value of the server k is equal to or less than the threshold value for every time zone after the present time in a result of the calculation in S212 (S213).

When it is determined that there is a time zone for which the total prediction value of the server k exceeds the threshold value (YES in S213), the determination unit 13 returns to S209. When it is determined that the total prediction value of the server k is equal to or less than the threshold value for every time zone after the present time (YES in S213), the determination unit 13 selects the VMm as a VM to be moved and selects the server k as a movement destination server (S214). The instruction unit 14 instructs the management server 3 to move the VMm to the server k (S215).

When selecting a movement destination server, a plurality of servers may be capable of serving as a movement destination server. For example, the determination unit 13 calculates the free space of the memory for each time zone in advance for each server. Then, the determination unit 13 preliminarily assigns a smaller sequence number (a number corresponding to k) to a server having a larger minimum free space among free spaces for the respective time zones. By doing so, in S208 to S214, a server with the larger minimum free space among free spaces for the respective time zones may be preferentially selected as a movement destination.

Figure 8:
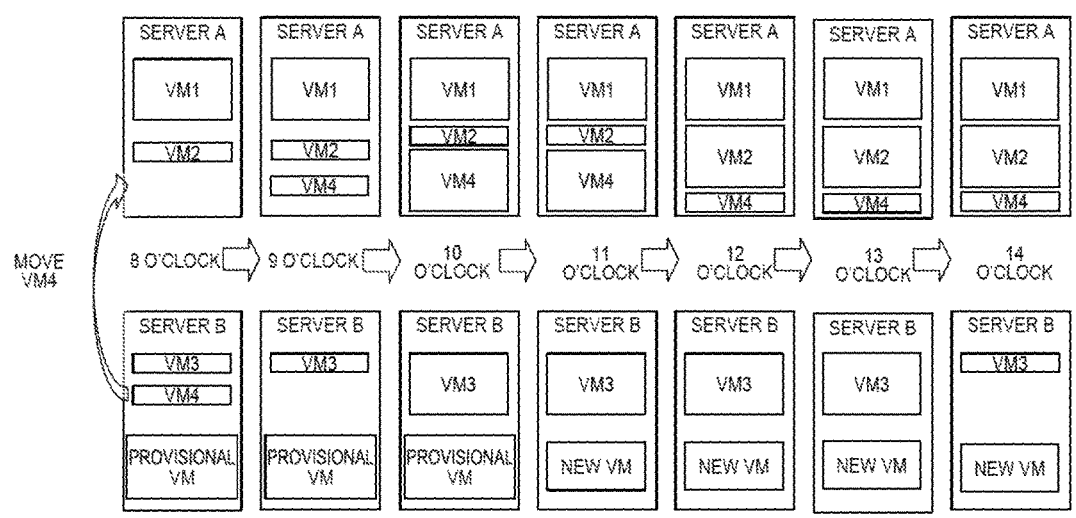
FIG. 8 is a diagram illustrating VM arrangement in each time zone in an Example.

An Example will now be described with reference to the drawings. FIG. 8 is a diagram illustrating VM arrangement in each time zone in the Example. FIG. 9 is a diagram illustrating usage information and provisional VM setting information in the Example. FIGS. 10 to 14 are diagrams illustrating the transition of prediction information in the Example.

Figure 10:
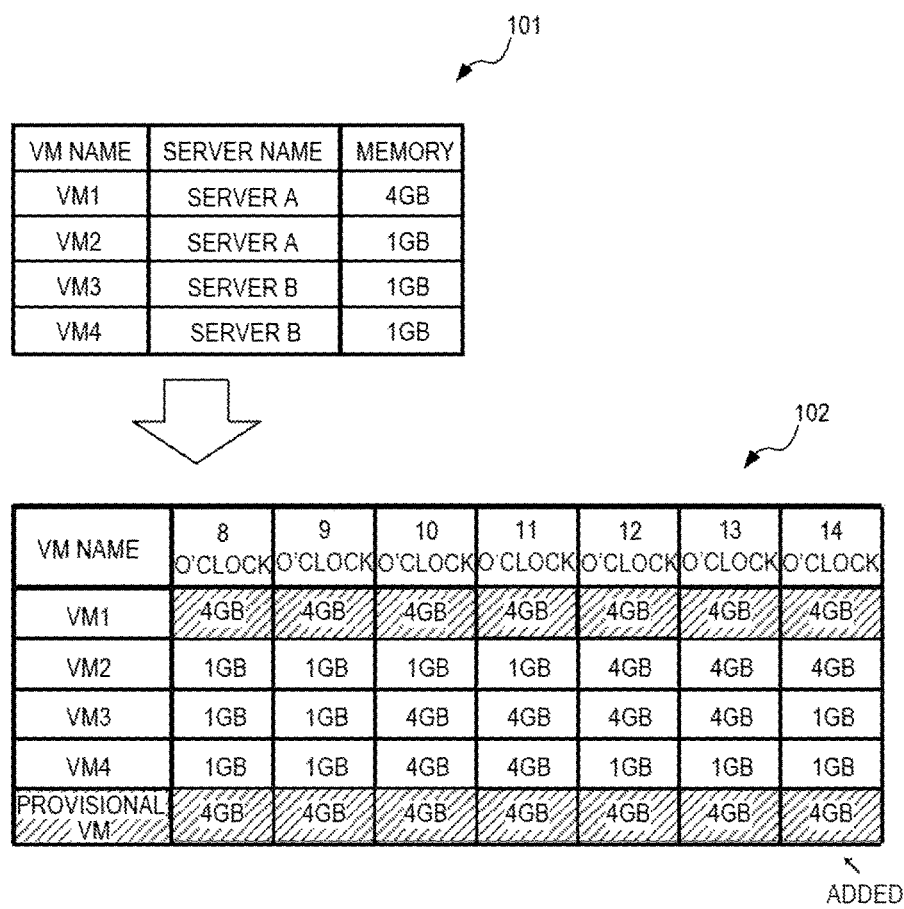
FIG. 10 is a diagram illustrating prediction information for each VM and memory usage of each VM at 8 o'clock in an Example.

The acquisition unit 12 acquires usage information 91 of the previous day and provisional VM setting information 92. The acquisition unit 12 creates prediction information on the basis of the usage information 91 by modifying the usage information 91 with the provisional VM setting information 92 (S101 and S102). FIG. 10 illustrates memory usage 101 and prediction information 102 for each VM at 8 o'clock. When comparing the memory usage at 8 o'clock in the usage information 91 of the previous day illustrated in FIG. 9 with the current (8 o'clock) memory usage 101 for each VM illustrated in FIG. 10, the memory usage of VM1 changes from 1 GB to 4 GB. That is, in the time zone of 8 o'clock, the current memory usage of VM1 is larger than the prediction value (YES in S110). Therefore, the determination unit 13 replaces the prediction value of VM1 for the current and subsequent time zones with the current memory usage of VM1 (S111-1). In the Example, the determination unit 13 changes the prediction value of VM1 in the prediction information 102 for 8 o'clock and subsequent time zones to 4 GB.

In this Example, it is assumed that the memory capacity of each of servers A and B is 10 GB and the threshold value is 9 GB which is 90% of 10 GB. In the prediction information at 8 o'clock, since a provisional VM is added, VMs operating on the server B at 10 o'clock are VM3, VM4 and the provisional VM, and the sum of prediction values is 4+4+4=12 GB. That is, at 10 o'clock, the total prediction value of the server B exceeds the threshold value (NO in S114). Therefore, it is necessary to move one of the VMs.

In S115, the determination unit 13 selects a VM to be moved. Under the assumption that VM3 is moved, the determination unit 13 determines whether or not the total prediction value of the server B is equal to or less than the threshold value for every time zone (S206). In this Example, since the total prediction value of the server B is equal to or less than the threshold value for every time zone, VM3 becomes a candidate for a VM to be moved. Further, under the assumption that VM3 is moved to the server A, the determination unit 13 determines whether or not the total prediction value of the server A is equal to or less than the threshold value for every time zone (S213).

When VM3 is moved to the server A, VM1, VM2, and VM3 will operate on the server A at 12 o'clock. Then, the total prediction value of the server A becomes 12 GB, which exceeds the threshold value. Therefore, the server A is not selected as a movement destination (NO in S213). In this case, since there are two servers in the Example, after S213, the result is NO in S210, and the process returns to S202.

Next, under the assumption that VM4 is moved from the server B, the determination unit 13 determines whether or not the total prediction value of the server B is equal to or less than the threshold value for every time zone (S206). Since the total prediction value of the server B is equal to or less than the threshold value for every time zone, VM4 is selected as a candidate for a VM to be moved. Further, under the assumption that VM4 is moved to the server A, the determination unit 13 determines whether or not the total prediction value of the server A is equal to or less than the threshold value for the server A for every time zone (S213). In the Example, since YES is determined in S213, the server A is selected as a movement destination of VM4 (S214). Then, the instruction unit 14 instructs the management server 3 to move VM4 to the server A, so that VM4 is moved from the server B to the server A.

Figure 11:
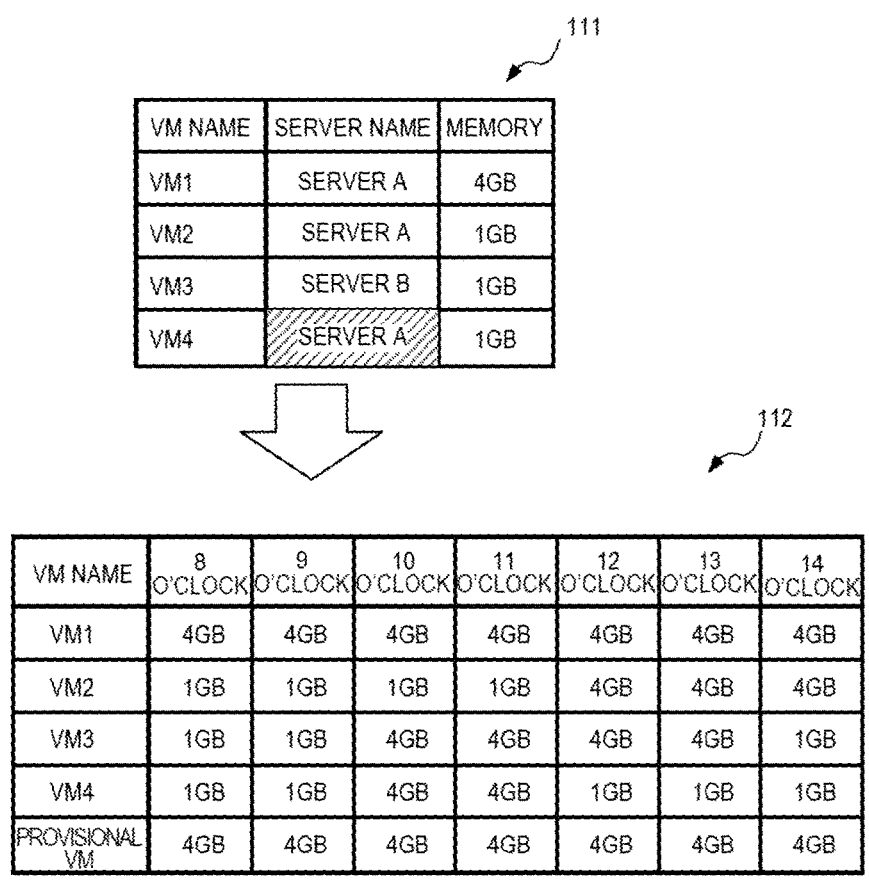
FIG. 11 is a diagram illustrating prediction information for each VM and memory usage of each VM at 9 o'clock in an Example.

FIG. 11 illustrates memory usage 111 and prediction information 112 for each VM at 9 o'clock. In this Example, since VM4 is moved from the server B to the server A at 8 o'clock, the name of the server on which VM4 operates is changed to the server A. Since the memory usage 111 at 9 o'clock is the same as the prediction information 112, the prediction information 112 is not updated (NO in S110). In addition, since the total prediction value of each server is equal to or less than the threshold value (YES in S114), no VM is moved.

Figure 12:
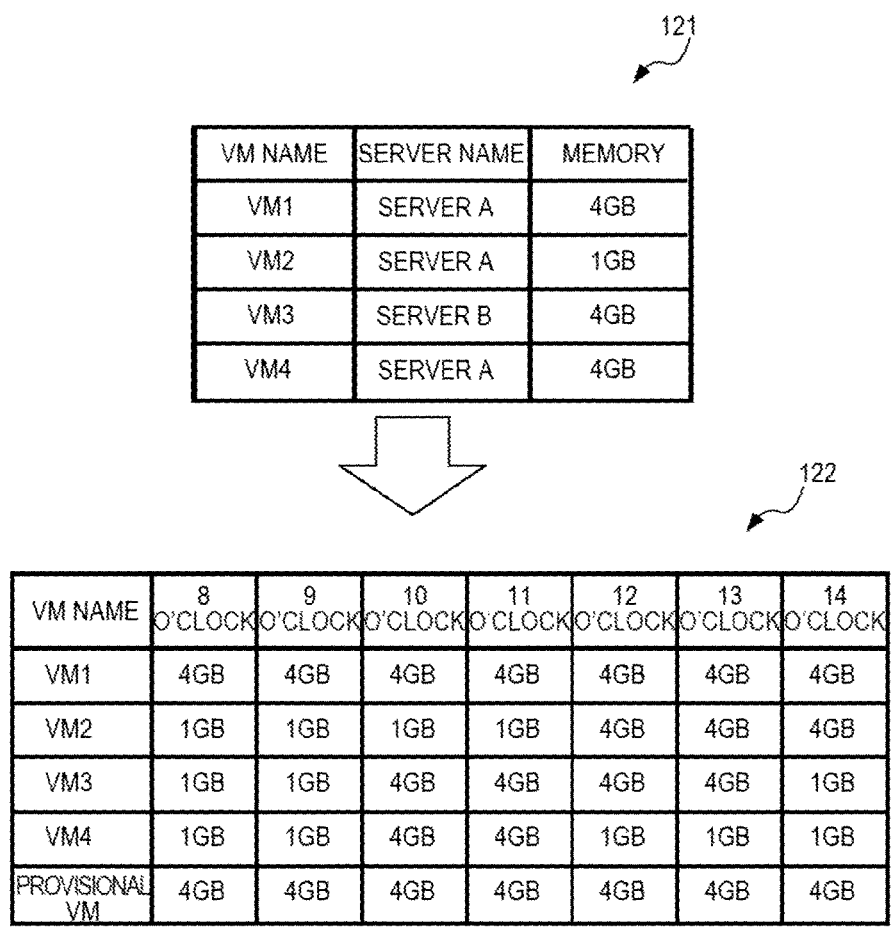
FIG. 12 is a diagram illustrating prediction information for each VM and memory usage of each VM at 10 o'clock in an Example.

FIG. 12 illustrates memory usage 121 and prediction information 122 for each VM at 10 o'clock. Since the memory usage 121 at 10 o'clock is the same as the prediction information 122, the prediction information 122 is not updated (NO in S110). In addition, since the sum of memory usages in each server is equal to or less than the threshold value (YES in S114), no VM is moved.

Figure 13:
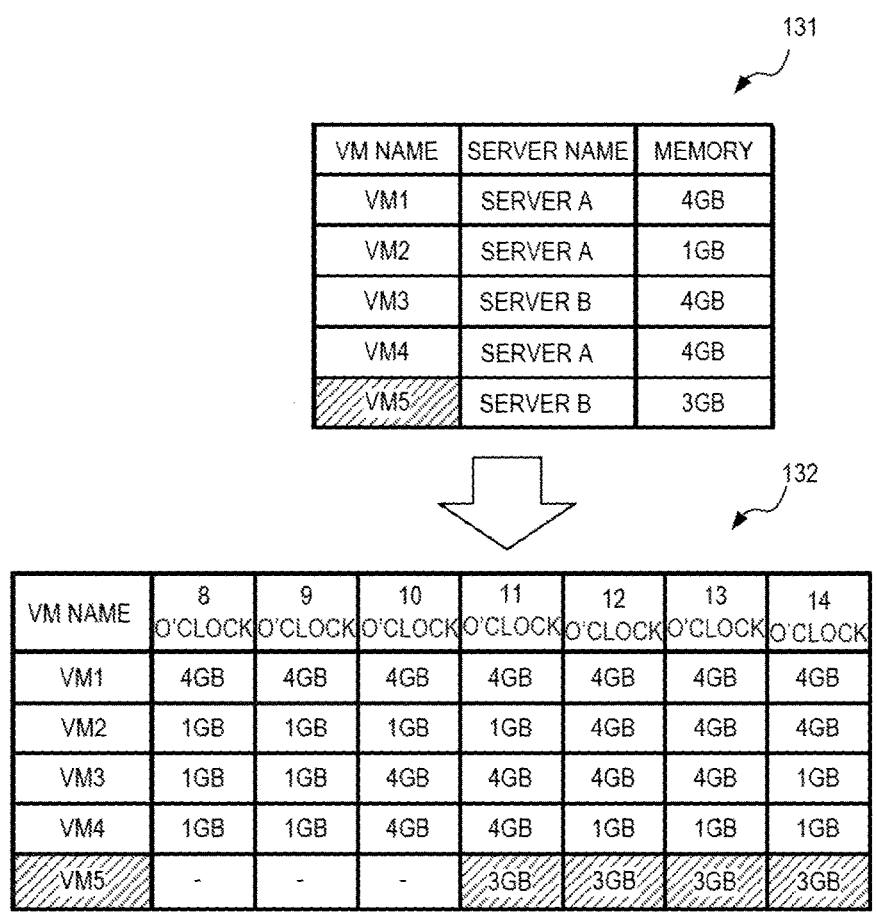
FIG. 13 is a diagram illustrating prediction information for each VM and memory usage of each VM at 11 o'clock in an Example.

FIG. 13 illustrates memory usage 131 and prediction information 132 for each VM at 11 o'clock. It is assumed that VM5 is deployed as a new VM which is not listed in the usage information at 11 o'clock. Since a provisional VM is set in the server B in the prediction information 132, the determination unit 13 decides to deploy VM5 in the server B (S105). Then, the instruction unit 14 instructs the management server 3 to deploy VM5 to the server B. A null value is set in the prediction information 132 for VM5 from 8 o'clock to 10 o'clock.

Figure 14:
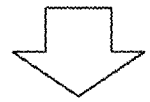
FIG. 14 is a diagram illustrating prediction information for each VM and memory usage of each VM at 12 o'clock in an Example.

FIG. 14 illustrates memory usage 141 and prediction information 142 for each VM at 12 o'clock. Since the memory usage 141 at 12 o'clock is the same as the prediction information 142, the prediction information 142 is not updated (NO in S110). In addition, since the sum of memory usages in each server is equal to or less than the threshold value (YES in S114), no VM is moved.

In the Example, memory usage at 13 o'clock and thereafter is assumed to be the same as the prediction information. That is, since update of prediction information and movement of VM are not performed as at 12 o'clock, description thereof will be omitted.

With the above processing, the virtual machine control device 1 may distribute the load of a physical server in the virtual environments. When there is a load imbalance between physical servers, when a VM on a physical server with high load uses resources a lot, the resources of the physical server are exhausted, and the throughput of all the VMs on the physical server may decrease. By eliminating the load imbalance between the physical servers, the virtual machine control device 1 may eliminate the possibility that the resources of any physical server will be exhausted even when a VM on the physical server has used the resources a lot.

With the progress of virtualized cloud environments, there is also a demand for a technology that may operate the total amount of resources of all physical servers without having a large margin in order to further reduce the facility costs. In such environments, VM movement at the point of time when a load is biased is not preferable because resources for VM movement are additionally used in a situation where resources are few. By preliminarily performing VM movement for memory load distribution in prediction of the future using past usage information, it is possible to prevent an occurrence of the additional memory load due to the VM movement during a period of a relatively high load.

A provisional VM is set in the usage information and when a new VM which is not listed in the usage information is added, the new VM is installed in a server in which the provisional VM is set. Thus, even when a new VM is added, the possibility of exceeding a threshold value of resource usage set in the server may be reduced.

Second Embodiment

In the first embodiment, when a candidate for a VM to be moved is not found (NO in S203), the process is ended as it is. In the first embodiment, the process of moving only one VM is performed. However, there is a possibility that the prediction value of a movement source server becomes equal to or less than the threshold value by moving two or more VMs. In a second embodiment, two or more VMs are moved. The system configuration in the second embodiment is the same as that illustrated in FIG. 1. Further, the configuration of a virtual machine control device 1 according to the second embodiment is the same as that illustrated in FIG. 2.

Figure 15:
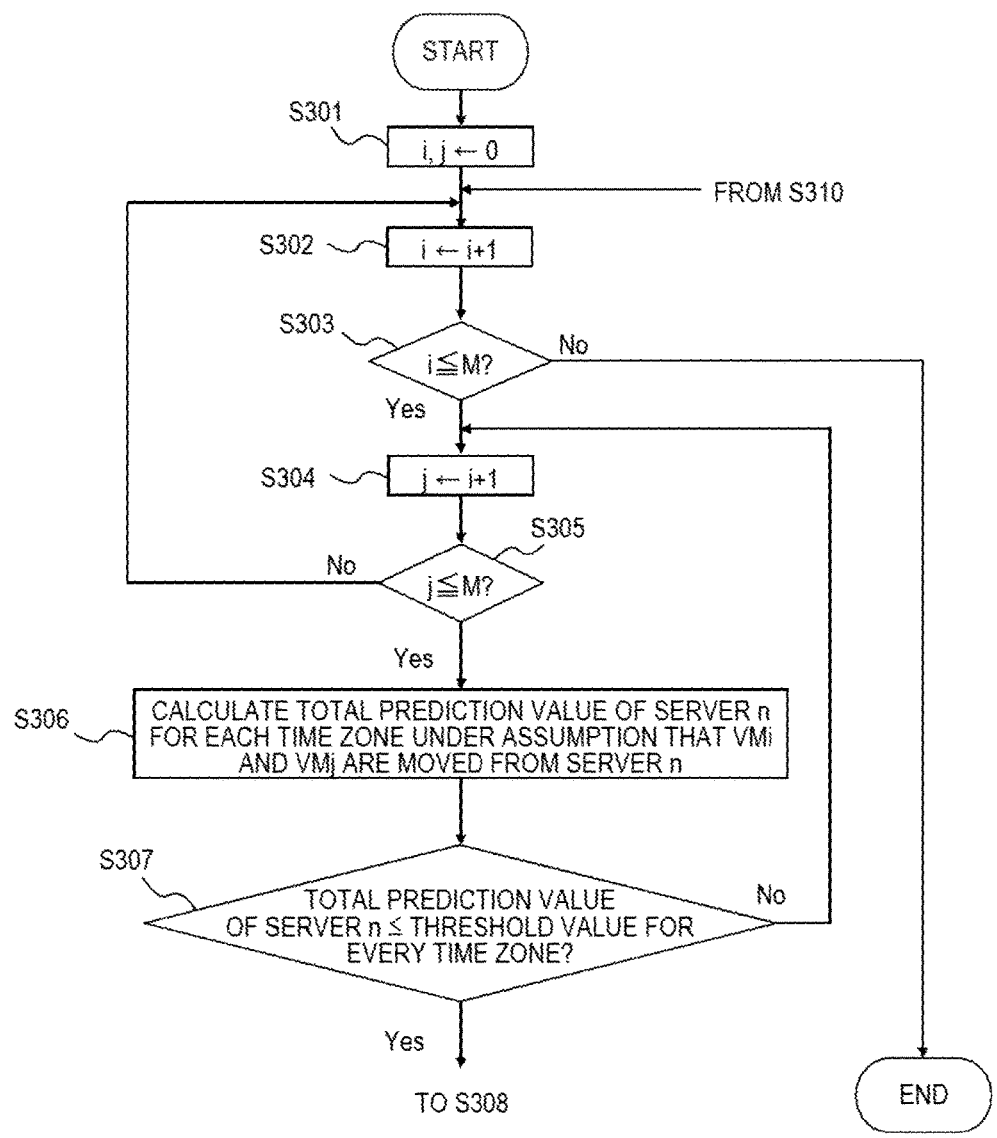
FIG. 15 is a flowchart illustrating an exemplary process of selecting a candidate for a VM to be moved according to a second embodiment.
Figure 16:
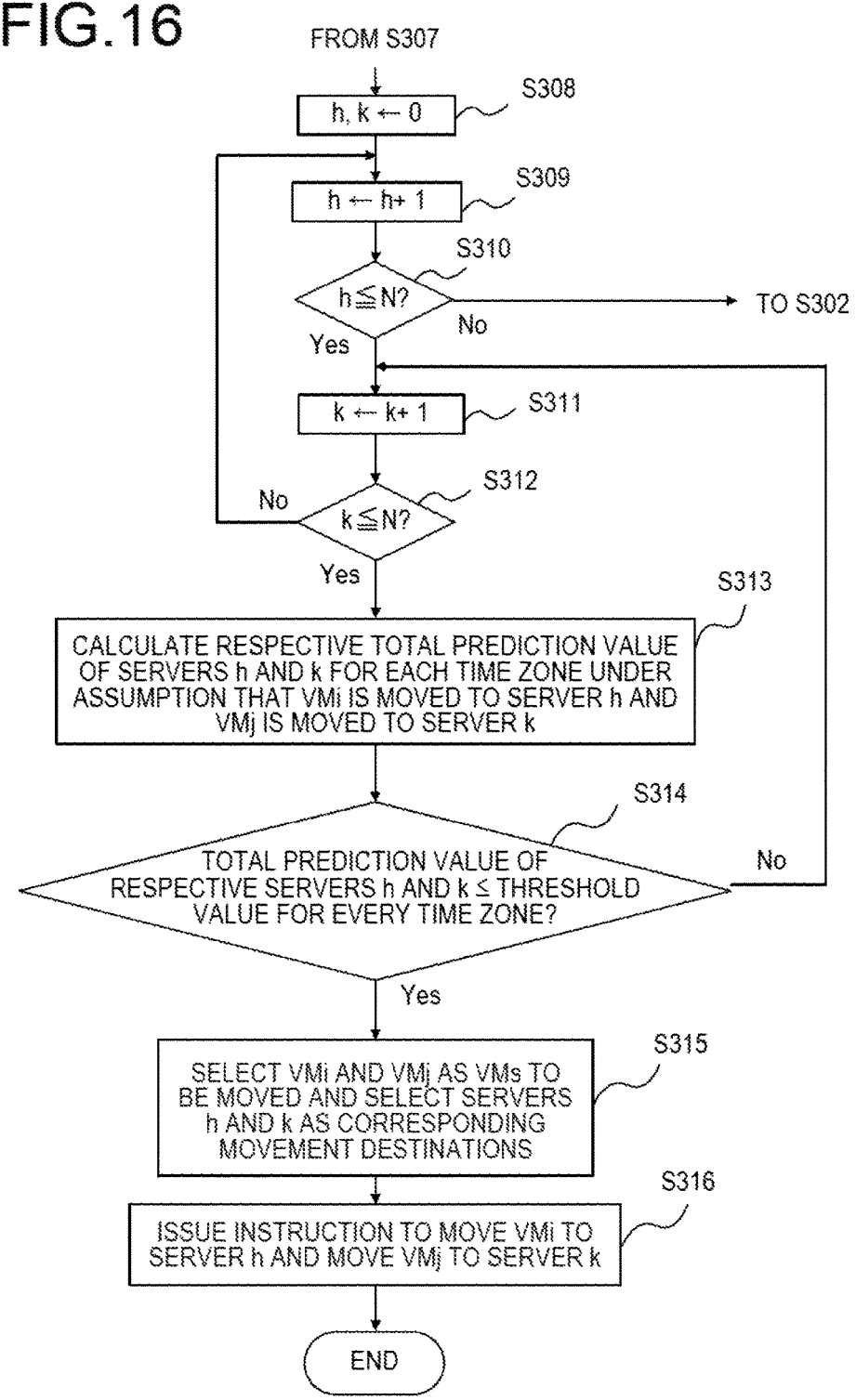
FIG. 16 is a flowchart illustrating an exemplary process of selecting a candidate for a VM to be moved according to a second embodiment.

FIGS. 15 and 16 are flowcharts illustrating an exemplary flow of a process of selecting a candidate for a VM to be moved according to the second embodiment. The process illustrated in FIGS. 15 and 16 is executed when it is determined as NO in S203 of FIG. 6. The other processes of the second embodiment are the same as those of the first embodiment illustrated in FIGS. 4 to 7.

The determination unit 13 sets 0 in variables i and j (S301). In addition, the determination unit 13 increments i by 1 (S302). The variables i and j correspond to the sequence numbers assigned to the respective VMs.

The determination unit 13 determines whether or not i is equal to or less than M (S303). When it is determined that i is larger than M (NO in S303), since the determination process is completed for all VMs, the process is ended.

The determination unit 13 sets i+1 in the variable j (S304) and checks whether or not j is equal to or less than M (S305).

When it is determined that j is equal to or less than M (YES in S305), under the assumption that Vmi and VMj are moved from the server n to another server in the current time zone, the determination unit 13 calculates the sum of prediction values of the respective VMs operating on the server n for each time zone (S306). The determination unit 13 determines whether or not the total prediction value of the server n calculated in S305 is equal to or less than the threshold value for every time zone (S307).

When it is determined that the total prediction value of the server n calculated in S305 is equal to or less than the threshold value for every time zone (YES in S307), the Vmi and VMj become candidates for VMs to be moved. When it is determined that the total prediction value of the server n exceeds the threshold value in any one time zone (NO in S307), the determination unit 13 returns to S304.

In a case of YES in S307, the determination unit 13 proceeds to a process of selecting movement destination servers. The determination unit 13 sets 0 in variables h and k (S308). Then, the determination unit 13 increments the variable h by 1 (S309). The variables h and k correspond to the sequence numbers assigned to each server.

The determination unit 13 determines whether or not h is equal to or less than N (S310). When it is determined that h is larger than N (NO in S310), the determination unit 13 returns to S302. This is because, even when the threshold value is exceeded for all servers when executing S314 (described later) under the assumption that the VMi and VMj are moved, there is a possibility that the total prediction value of the server n may be equal to or less than the threshold value in S314 by setting different VMi and VMj as candidates for VMs to be moved.

When it is determined that h is equal to or less than N (YES in S310), the determination unit 13 increments the variable k by 1 (S311). The determination unit 13 determines whether or not k is equal to or less than N (S312). When it is determined that k is larger than N (NO in S312), the determination unit 13 returns to S309.

When it is determined that k is equal to or less than N (YES in S312), under the assumption that the VMi is moved to a server h and the VMj is moved to a server k, the determination unit 13 calculates the sum of prediction values of VMs operating on the respective servers h and k for each time zone (S313).

When it is determined that there is a time zone in which the total prediction value of any of the servers h and k exceeds a threshold value (NO in S314), the determination unit 13 returns to S311. When it is determined that the total prediction value of each of the servers h and k is equal to or less than the threshold value for every time zone (YES in S314), the determination unit 13 selects the VMi and the VMj as VMs to be moved and selects the servers h and k as movement destination servers (S315). The instruction unit 14 instructs the management server 3 to move the VMi to the server h and move the VMj to the server k (S316).

As described above, the virtual machine control device 1 according to the second embodiment moves a plurality of VMs when moving one VM does not cause the total prediction value of a movement source server to become equal to or less than a threshold value. Thereby, the virtual machine control device 1 may improve the possibility that the total prediction values of all servers becomes equal to or less than the threshold value.

Although two VMs are moved in the second embodiment, three or more VMs may be moved. Further, although a plurality of VMs are moved to different servers in the second embodiment, two or more VMs may be moved to the same server.

Figure 17:
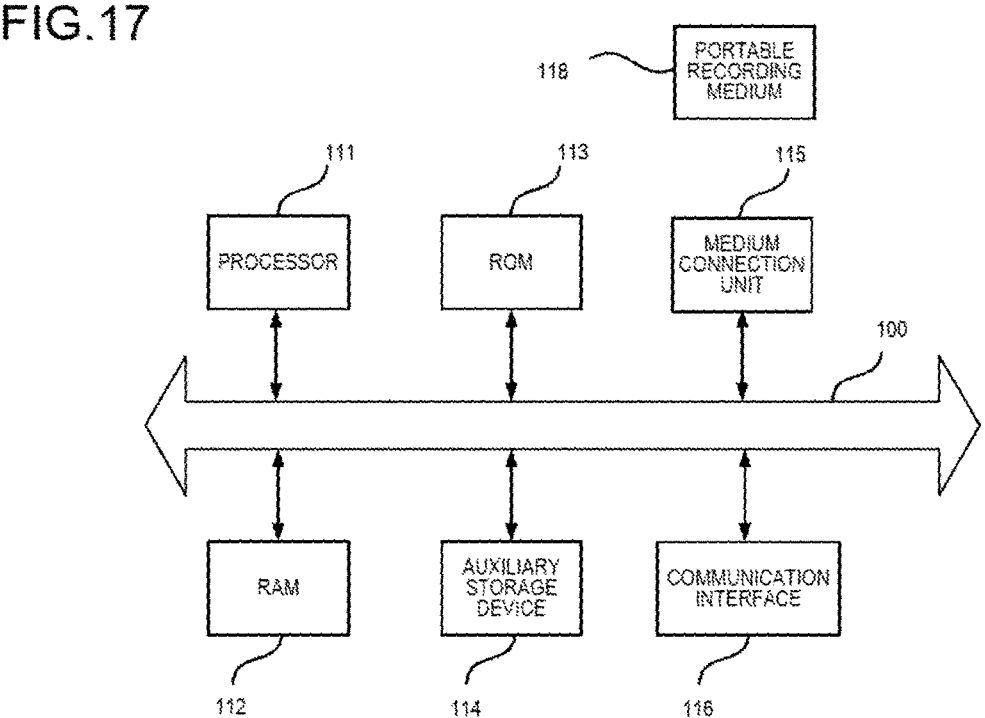
FIG. 17 is a diagram illustrating an exemplary hardware configuration of a virtual machine control device.

Next, an exemplary hardware configuration of the virtual machine control device 1 will be described with reference to FIG. 17. As illustrated in FIG. 17, the virtual machine control device 1 includes a processor 111, a random access memory (RAM) 112, and a read-only memory (ROM) 113 which are coupled to each other via a bus 100. Further, the virtual machine control device 1 includes an auxiliary storage device 114, a medium connection unit 115, and a communication interface 116 which are also coupled to the bus 100.

The processor 111 executes a program loaded on the RAM 112. The program to be executed may be a virtual machine control program for performing the processes in the embodiments.

The ROM 113 is a nonvolatile storage device that stores therein the program to be loaded on the RAM 112. The auxiliary storage device 114 is a storage device that stores therein various kinds of information. The auxiliary storage device 114 may be a hard disk drive, a semiconductor memory, or the like. The medium connection unit 115 is provided so as to be coupled to a portable recording medium 118.

The portable recording medium 118 may be a portable memory or an optical disc (for example, a compact disc (CD), a digital versatile disc (DVD), a semiconductor memory, etc.). The virtual machine control program for performing the processes in the embodiments may be recorded on the portable recording medium 118.

The storage unit 15 illustrated in FIG. 2 may be implemented with the RAM 112, the auxiliary storage device 114, or the like. The communication unit 11 illustrated in FIG. 2 may be implemented with the communication interface 116. The acquisition unit 12, the determination unit 13, and the instruction unit 14 illustrated in FIG. 2 may be implemented with the processor 111 by executing the virtual machine control program.

The RAM 112, the ROM 113, the auxiliary storage device 114, and the portable recording medium 118 are examples of tangible computer-reading recording media, which are not transitory media such as signal carriers.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
acquiring usage information stored in a storage unit, the usage information including an actual usage value of respective virtual machines operating on each of information processing apparatuses during each of past periods, the actual usage value being an amount of a resource used by the respective virtual machines during each of the past periods;
creating prediction information for each of the information processing apparatuses on basis of the acquired usage information, the prediction information including a prediction usage value of the respective virtual machines during each of periods corresponding to the past periods, the prediction usage value being an amount of the resource to be used by the respective virtual machines operating on each of the information processing apparatuses during each of the periods;
determining, upon detecting a first virtual machine whose actual usage value is not included in the usage information, whether a first period exists, in which a sum of the actual usage value of the first virtual machine and prediction usage values of virtual machines operating on a first apparatus of the information processing apparatuses exceeds a criterion for the first apparatus, the first virtual machine operating on the first apparatus; and
issuing, upon determining that the first period exists, an instruction to move one of virtual machines operating on the first apparatus to a second apparatus of the information processing apparatuses before the first period, the second apparatus being different from the first apparatus.

2. The non-transitory computer-readable recording medium according to claim 1, the process further comprising:
adding a first prediction usage value of a provisional virtual machine during each of the periods to the prediction information for a third apparatus of the information processing apparatuses;
assigning, when deploying a new virtual machine whose prediction usage value is not included in the prediction information for any of the information processing apparatuses, the new virtual machine to the provisional virtual machine and replacing the first prediction usage value with a preset usage value of the new virtual machine, the preset usage value being a preset amount of the resource to be used by the new virtual machine; and
determining whether a period exists, in which a sum of the prediction usage values included in the prediction information for the third apparatus exceeds a criterion for the third apparatus.

3. The non-transitory computer-readable recording medium according to claim 1, the process further comprising:
determining whether a first actual usage value of a second virtual machine for a current period is larger than a first prediction usage value of the second virtual machine for the current period, the second virtual machine operating on the first apparatus;
replacing, upon determining that the first actual usage value is larger than the first prediction usage value, prediction usage values of the second virtual machine for the current period and subsequent periods with the first actual usage value as long as the first actual usage value is larger than the prediction usage values for the subsequent periods; and
determining whether a period exists, in which a sum of the prediction usage values included in the prediction information for the first apparatus exceeds the criterion for the first apparatus.

4. The non-transitory computer-readable recording medium according to claim 1, the process further comprising:
determining whether a second period exists, in which a sum of an actual usage value of a second virtual machine and prediction usage values of virtual machines operating on the second apparatus exceeds a criterion for the second apparatus, the second virtual machine operating on the first apparatus;
determining, upon determining that the second period exists, that the second virtual machine is a candidate virtual machine to be moved to the second apparatus; and
issuing, when there are more than one candidate virtual machine, an instruction to move a third virtual machine to the second apparatus, the third virtual machine having a smallest prediction usage value among the more than one candidate virtual machine.

5. A virtual machine control method, comprising:
acquiring, by a computer, usage information stored in a storage unit, the usage information including an actual usage value of respective virtual machines operating on each of information processing apparatuses during each of past periods, the actual usage value being an amount of a resource used by the respective virtual machines during each of the past periods;
creating prediction information for each of the information processing apparatuses on basis of the acquired usage information, the prediction information including a prediction usage value of the respective virtual machines during each of periods corresponding to the past periods, the prediction usage value being an amount of the resource to be used by the respective virtual machines operating on each of the information processing apparatuses during each of the periods;
determining, upon detecting a first virtual machine whose actual usage value is not included in the usage information, whether a first period exists, in which a sum of the actual usage value of the first virtual machine and prediction usage values of virtual machines operating on a first apparatus of the information processing apparatuses exceeds a criterion for the first apparatus, the first virtual machine operating on the first apparatus; and
issuing, upon determining that the first period exists, an instruction to move one of virtual machines operating on the first apparatus to a second apparatus of the information processing apparatuses before the first period, the second apparatus being different from the first apparatus.

6. A virtual machine control device, comprising:

a memory; and a processor coupled to the memory and the processor configured to:

acquire usage information stored in the memory, the usage information including an actual usage value of respective virtual machines operating on each of information processing apparatuses during each of past periods, the actual usage value being an amount of a resource used by the respective virtual machines during each of the past periods;

create prediction information for each of the information processing apparatuses on basis of the acquired usage information, the prediction information including a prediction usage value of the respective virtual machines during each of periods corresponding to the past periods, the prediction usage value being an amount of the resource to be used by the respective virtual machines operating on each of the information processing apparatuses during each of the periods;

determine, upon detecting a first virtual machine whose actual usage value is not included in the usage information, whether a first period exists, in which a sum of the actual usage value of the first virtual machine and prediction usage values of virtual machines operating on a first apparatus of the information processing apparatuses exceeds a criterion for the first apparatus, the first virtual machine operating on the first apparatus; and issue, upon determining that the first period exists, an instruction to move one of virtual machines operating on the first apparatus to a second apparatus of the information processing apparatuses before the first period, the second apparatus being different from the first apparatus.

\* \* \* \* \*